United States Patent [19]
Ueda et al.

[11] Patent Number: 5,539,863
[45] Date of Patent: Jul. 23, 1996

[54] METHOD AND APPARATUS FOR POSITIONING AN IMAGE ONTO A RECORDING MEDIUM

[75] Inventors: Hiroyuki Ueda, Irvine, Calif.; Hideo Shibaoka, Kawasaki; Hiroko Shimoyama, Yokohama, both of Japan

[73] Assignee: Canon Business Machines, Inc., Costa Mesa, Calif.

[21] Appl. No.: 54,280

[22] Filed: Apr. 30, 1993

[51] Int. Cl.⁶ .................................................. G06K 15/00
[52] U.S. Cl. ......................................... 395/102; 395/117
[58] Field of Search ................................... 395/117, 105, 395/111, 106, 115, 102; 400/76, 64, 63; 382/291

[56] References Cited

U.S. PATENT DOCUMENTS

| | | | |
|---|---|---|---|
| 4,233,636 | 11/1980 | Harbaugh et al. | 358/287 |
| 4,311,399 | 1/1982 | Wegryn et al. | 400/76 |
| 4,500,216 | 2/1985 | Demonte et al. | 400/63 |
| 4,848,940 | 7/1989 | Mori | 400/64 |
| 5,047,956 | 9/1991 | Hirami et al. | 395/105 |
| 5,086,346 | 2/1992 | Fujisawa | 382/291 |
| 5,208,902 | 5/1993 | Kumon | 395/116 |

FOREIGN PATENT DOCUMENTS

| | | | |
|---|---|---|---|
| 0009378 | 4/1980 | European Pat. Off. | 395/117 |
| 62-293265 | 12/1987 | Japan | 395/117 |

OTHER PUBLICATIONS

"Micrografx Draw Plus—Using Draw Plus", Micrografx Inc., 1988, pp. 7-1 to 7-13.
"User's Guide to Microsoft Publisher", Microsoft Corporation, 1993, pp. 234-264.

*Primary Examiner*—Arthur G. Evans
*Attorney, Agent, or Firm*—Fitzpatrick, Cella, Harper & Scinto

[57] ABSTRACT

An image printer includes a controller for controlling image printer operations, an image storing device for storing image data, an image printer including a print head for printing image data stored in the image storing device and a print position setter for setting a print position of the image printing means. The controller provides current position data to the print position setter, and the left print position is set in accordance with a current position of the print head of the image printer. A right position is set by adding a horizontal printing width of the stored image to the left print position. Alternatively, the controller provides current position data to the print position setter, and the right print position of the stored image is set to a current position of the print head of the image printer and a left position is set by subtracting a horizontal printing width of the stored image from the right print position. In either case, the print head is moved to the set positions and the operator is provided with the opportunity to alter the positions if the positions are deemed unacceptable.

59 Claims, 7 Drawing Sheets

METHOD AND APPARATUS FOR POSITIONING AN IMAGE ONTO A RECORDING MEDIUM

BACKGROUND OF THE INVENTION

1. Field of the Invention

The present invention relates to a printing method and printing apparatus for accurately positioning an image on a recording medium by determining end positions of an image with respect to the recording medium. More particularly, the present invention relates to an image printer such as a type used in an electronic word processor which accurately positions an image to be printed onto a recording medium by determining the image size with respect to the recording medium size, and performs a locating operation of a left end and a locating operation of a right end of the image with respect to the recording medium prior to a print operation.

2. Description of the Related Art

Precise positioning of printed images such as illustrations and logos is desirable so that the overall impression made by those images, such as on Christmas cards and labels, is pleasing. But conventional printing systems which utilize on-line printers such as dot matrix or ink jet printers are ill-equipped to position an image to be printed onto a recording medium because preset coordinates of a printer do not allow for precise positioning of images or text onto the recording medium. Thus, conventional printing systems do not allow for precise image positioning.

Recently, however, word processing systems have been developed in which an operator utilizing the word processing system can designate image coordinates based on a computer-generated display of a recording medium with an overlayed image to be printed. That is, an image to be printed can be overlaid on an image of a recording medium to determine the correct positioning of the image. The operator performs this operation by utilizing a pointing device such as a cursor or a mouse to manipulate an image onto a displayed recording medium.

In spite of these developments, the displayed images are not accurately positioned since coordinate data of the display frequently deviates from the actual print position of a printing head with respect to the recording medium. Thus, precise positioning of an image onto a recording medium of a similar size is still not easily performed.

Other solutions to resolve inaccurate positioning of an image or text on a recording medium are time-consuming and costly. For example, it has been considered to provide visual confirmation of a printing position on a recording medium by physical manipulation of the printing head for each designated point of an image within the recording medium, or to provide an operator determination of a size of the image and that of the recording medium by performing various calculating operations. Both are very time-consuming operations and are inefficient.

Heretofore, it has not been possible to position accurately an image onto a recording medium both quickly and accurately utilizing conventional methods. Consequently, images are often improperly printed on the recording medium.

SUMMARY OF THE INVENTION

It is an object of the present invention to address the foregoing difficulties and to provide a printing apparatus which accurately designates the position of an image to be printed onto a recording medium.

In one aspect, the present invention is an image printer having a controller for controlling image printer operations, an image storing device for storing image data, an image printer including a print head for printing image data stored in the image storing device and a print position setter for setting a print position of the image printing means. The controller provides current position data to the print position setter, and the left print position is set in accordance with a current position of the print head of the image printer. A right position is set by adding a horizontal printing width of the stored image to the left print position.

In another aspect of the invention, the controller provides current position data to the print position setter, and the right print position of the stored image is set to a current position of the print head of the image printer and a left position is set by subtracting a horizontal printing width of the stored image from the right print position.

In another aspect of the present invention, there is a method for positioning an image onto a recording medium. The method includes the steps of determining the size of an image to be printed, designating a first end position of the image with respect to the recording medium, confirming the first end position, designating a second end position by shifting the first end position in accordance with the size of the image, and confirming the second end position.

This brief summary of the invention has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
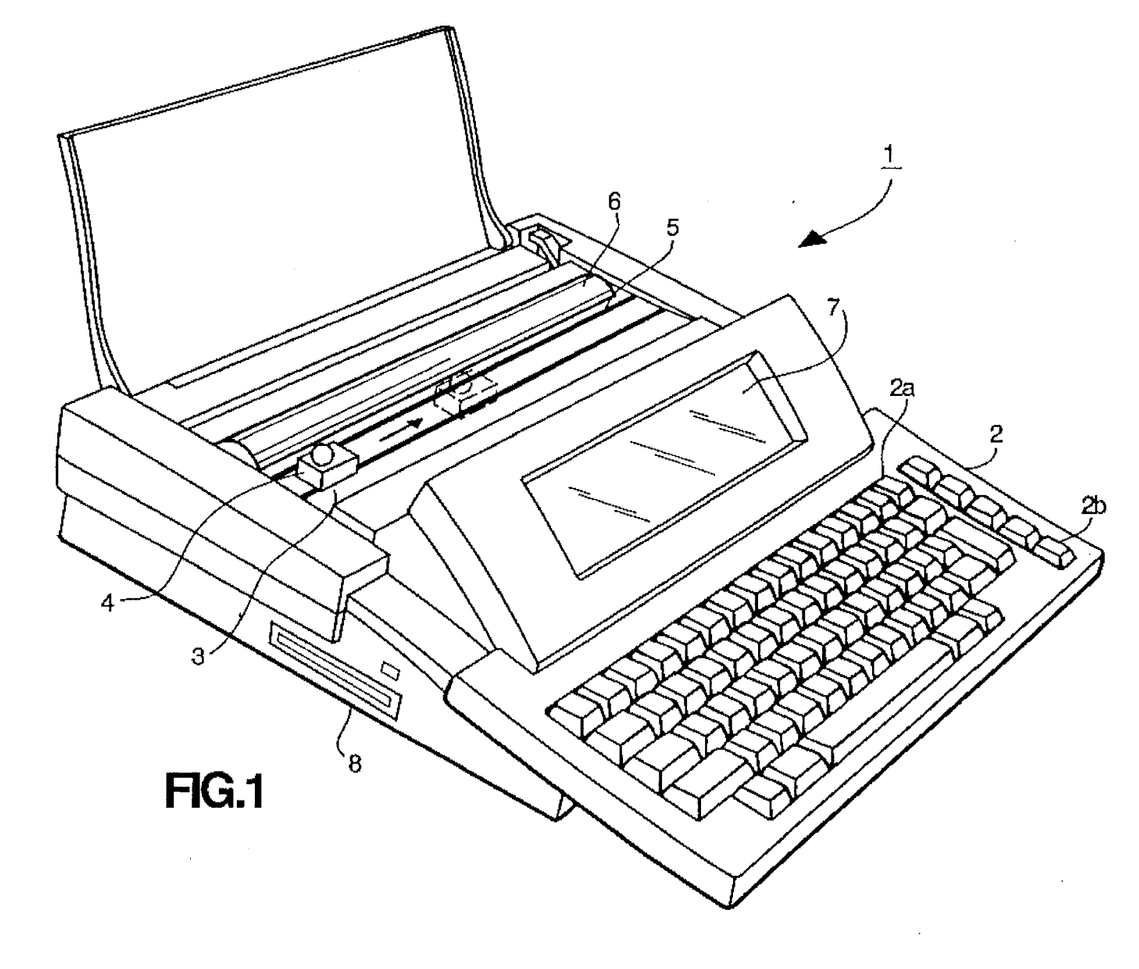
FIG. 1 is a representational view of an image printer according to the present invention.

FIG. 1 is a representational view of an image printer comprised by an electronic word processor 1. Word processor 1 includes input means such as keyboard 2 and output means such as printer 3. Printer 3 includes printer head 4 which moves laterally from side to side on carrier 5. Any suitable means may be used for printer head 4, such as a dot matrix print head, an ink jet print head or a thermal print head. Printer head 4 forms an image onto a recording medium (not shown) which is disposed between printer head 4 and roller 6.

Word processor 1 further includes display 7 for displaying text and/or images to be printed and floppy disk drive 8. Floppy disk drive 8 receives and reads a floppy disk (not shown) which contains image data as well as other document data such as text data. A floppy disk inserted into floppy disk drive 8 may be utilized for inputting such data into word processor 1.

Figure 2:
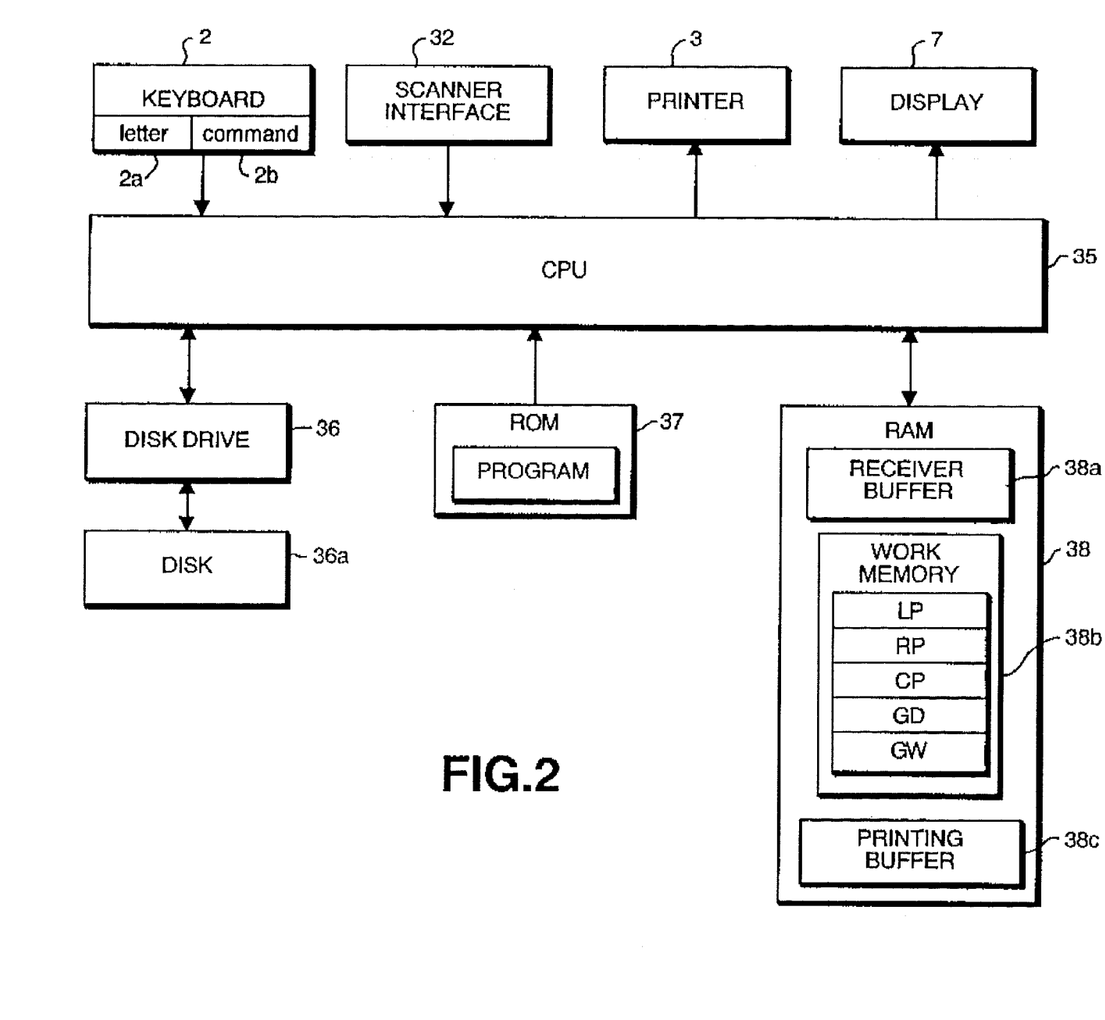
FIG. 2 is a functional block diagram of the FIG. 1 printing system.

FIG. 2 is a functional block diagram of word processor 1.

In FIG. 2, keyboard 2 consists of letter keys 2a and command keys 2b. The keys are depressed by an operator to enter text data and to enter key code data and commands. Key code data and commands are issued by the operator to control word processor functions such as margins, fonts, underlining, line spacing, memory utilization, etc. Printer 3 prints document data and image data stored in RAM 38 by utilizing print head 4 to output an image onto a recording medium. Display 7 displays document data and image data stored in RAM 38. Word processor 1 also includes an image scanner interface 32 which interfaces to an unshown scanner. The image scanner reads image data as binary data from a sheet of paper. Image data scanned by the image scanner is also stored in RAM 38. Floppy disk drive unit 8 reads and inputs document data and/or image data stored on disk 36a.

Operations of word processor 1 are controlled by central processing unit (CPU) 35. CPU 35 processes operation commands, document data, and image data based on key code data input from keyboard 2. CPU 35 controls the operations of the image printer and manipulates data in accordance with process steps stored in ROM 37. ROM 37 contains process steps for controlling the functions of word processor 1 which can be accessed by CPU 35 in accordance with key entries on keyboard 2.

In addition to receiving image data scanned through image scanner interface 32, RAM 38 also receives and stores data in receiver buffer 38a which stores input documents and input images, work memory 38b which stores time constants to be processed by CPU 35 during the execution of process steps stored in ROM 37, and printing buffer 38c which temporarily stores image data from receiver buffer 38a at the time of printing a stored input image.

In operation, a key entry by an operator is received by CPU 35. In accordance with the key entry, CPU 35 accesses process steps stored in ROM 37. For example, a command by an operator may be entered via keyboard 2 to perform a scanning operation or print operation. When the command is received, CPU 35 performs a fetch operation to retrieve the necessary process steps from ROM 37. Other operations may be performed to send a request to floppy disk drive unit 36 to read image data stored on disk 36a. Once the image data is read, the data is stored to RAM 38. In the case that data is either input by floppy disk drive unit 36 or through scanner interface 32, all data is stored to RAM 38. Data can then be displayed on display 7 or printed by printer 3. In a case that the data is to be displayed, the image data is displayed on display 7. However, in the case that the image is to be printed on printer 3, image data will be processed by CPU 35 by reading data from receiver buffer 38a and outputting the data to printer 3. Prior to performing the actual printing operation, the position of an image with respect to the recording medium is set. The process of positioning the image will be discussed in more detail with respect to FIGS. 3–5.

Figure 3:
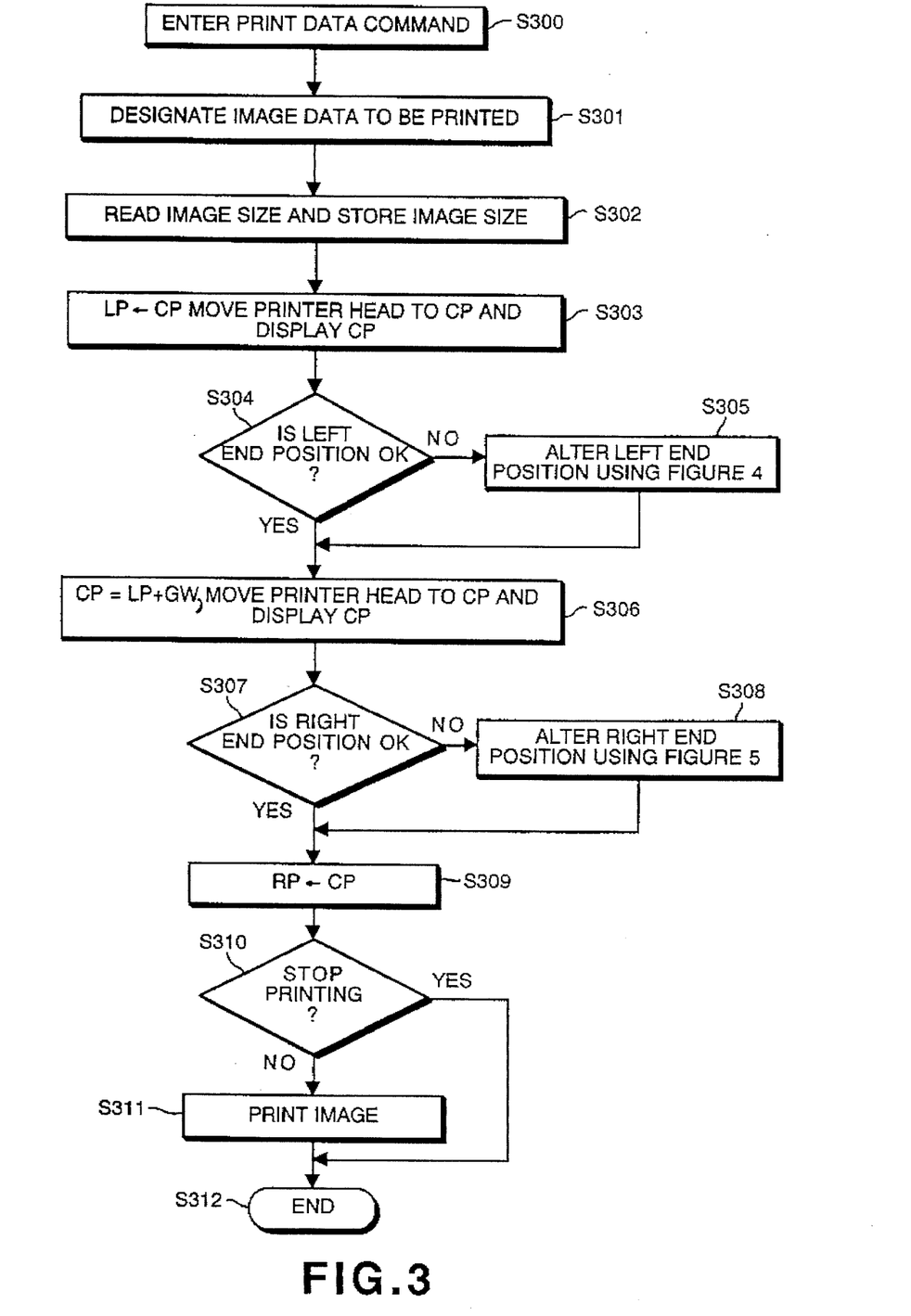
FIG. 3 is a flow diagram which illustrates the control procedure for setting print positions of a recording medium at the time of executing a print operation.

FIG. 3 is a block diagram illustrating process steps for positioning image data onto a recording medium prior to performing the printing operation. The process steps illustrated in FIG. 3 are stored in program ROM 37 and are executed by CPU 35 in response to operator commands.

In step S300, normally, print head 4 remains at a home position then an operator enters a command via keyboard 2 to initiate a printing operation of an image. In step S301, a type of image data to be printed is designated by an operator. For the purposes of designating an image, an operator has the choice of choosing image data from either disk 36a, ROM 37, image data captured by the image scanner, and image data stored in receiver buffer 38a.

In step S302, a size of the image data designated by the operator in step S301 is examined. The number of picture elements of image data is stored in a variable contained in work memory 38b as follows: the number of picture elements in the lateral direction is stored in variable GW, and the number of picture elements in the vertical direction is stored in variable GD. Upon examining the size of the image and storing the size information in variables GD and GW, a comparison is made to determine if the picture element density of the image data is different from a dot density of printer 3 or if a printing magnification has been varied due to an enlargement function or a reduction function. If either answer is true then a value, which is obtained by multiplying the number of picture elements of the image data by the appropriate conversion rate, is stored in variable GW and variable GD.

In step S303, a current physical position of print head 4 is stored in variable CP of work memory 38b. Variable CP, which indicates a current position of print head 4, is used as an initial setting for determining image alignment. An operator sets a print position for the upper left end of the image utilizing variable CP as an initial value, and the value of the left end is stored in variable LP. An image of the print head 4 is then displayed on display 4 with respect to an image of the recording medium. The display may be in any suitable form, e.g., a digital type or a scale type or an image print range indication or a compressed image display.

In step S304, the operator confirms whether the left end position is acceptable or not. If the left position is not acceptable, flow proceeds to step S305 where the left end position is altered as discussed in greater detail with respect to FIG. 4. After the left end position has been set, it may be desirable to initiate the printing of the designated image. Otherwise, the setting of a right end position will commence, as described below.

At this point, the left end position is set and, beginning with step S306, the process for setting a right end position begins. The right end position is determined by adding the value in variable GW determined in step S302 to the value stored in variable LP- The result is stored in variable CP. In step S306, print head 4 is moved to a position corresponding to the newly set variable CP. As a result, the position of print head 4 is at the right end position.

Once the right end position has been calculated in step S306, the operator can confirm whether the right end position with respect to the recording medium is acceptable or not (in step S307). In step S307, after print head 4 has been moved to a position corresponding to variable CP, if the right end position is not acceptable, then in step S308 the operator designates a new right end position as described below in FIG. 5. The new position is set as the right end position as long as it is a valid position. On the other hand, if the right end position is confirmed, the operator confirms the position and in step S309 the current position of print head 4 is stored in variable RP.

Once the right end position is set, a determination is made as to whether or not the operator has issued a stop image printing command (step S310). In the case that such a command has been input, processing is immediately stopped. However, if such a command has not been entered, flow proceeds to step S311. In step S311, variable LP set in step S304, variable RP set in step S307, and the image data designated by the operator in step S301 are combined and output to printer buffer 38c. Printer buffer 38c sends the data to printer 3 to develop an image on a recording medium.

Figure 4:
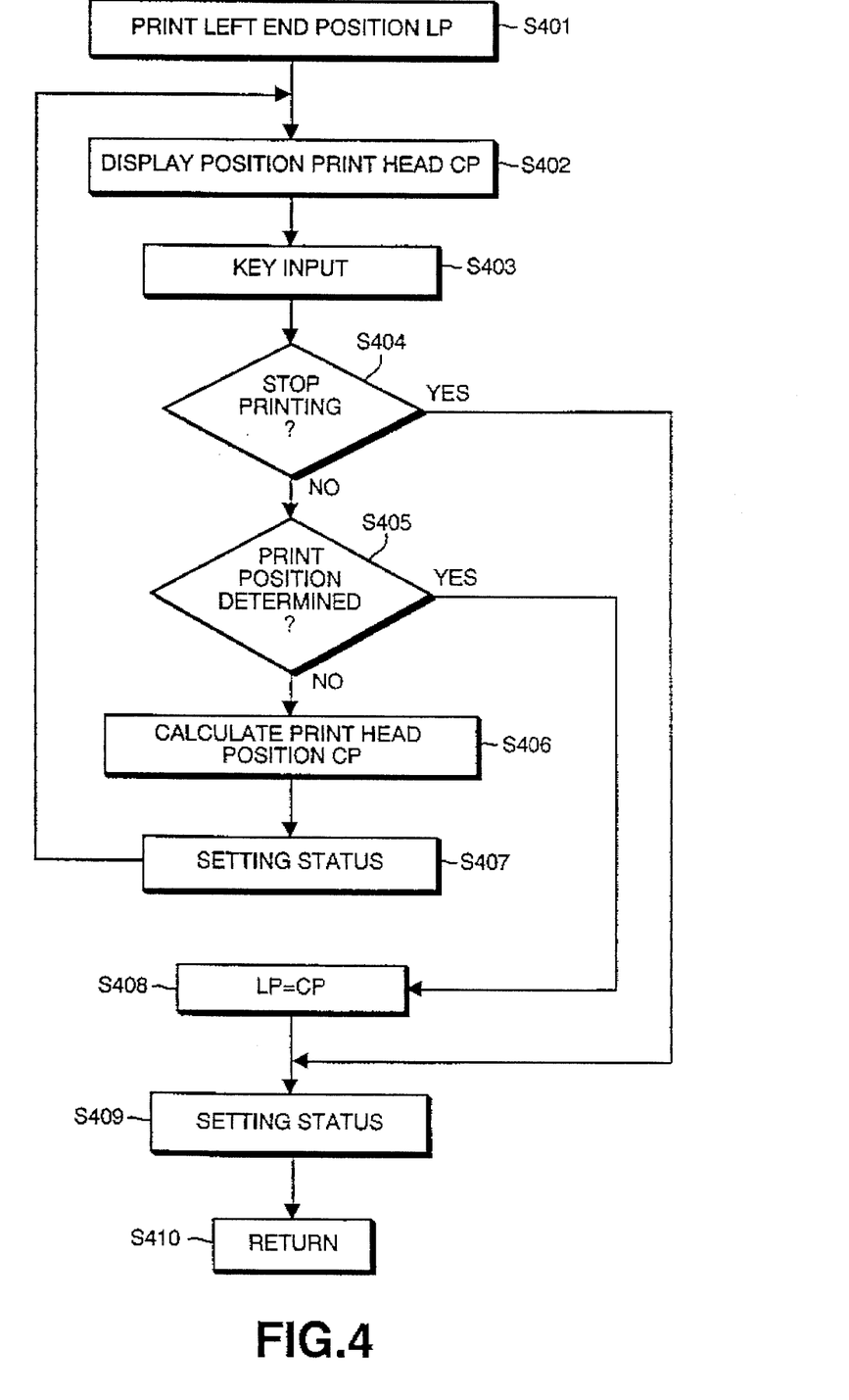
FIG. 4 is a flow diagram which illustrates in greater detail step S305 of FIG. 3 which is the procedure for setting a print position of the upper left end of a recording medium.

FIG. 4 is a flow diagram which describes in more detail step S305 of FIG. 3 which is the process of altering a print position of the upper left end of an image with respect to a recording medium.

Referring now to FIG. 4, in step S401 the operation of setting a left end of an image is initiated. In step S402, a value of variable CP, which indicates a current position of print head 4, is displayed on display 7. As before, any suitable form for display may be used, e.g., a digital type or a scale type position display, or a print range indication of the image, or a compressed image display, displayed against an image of the recording medium.

In step S403, after the position of print head 4 has been displayed to the operator, the operator can either confirm the position of print head 4 or redesignate a new position for print head 4 by entering a command via keyboard 2. In step S404, the command is examined to determine if the command is a stop image printing command or if a command has been entered to designate a new left end print position (step S405). If in step S404 a stop command has been entered, flow proceeds to step S409 and print stop command is stored in RAM 38. However, if a stop printing command has not been entered, flow proceeds to step S405 to determine if the left end position is appropriate. If a new print position is to be designated, then in step S406 the operator designates a new position for print head 4 by using the keyboard to manipulate the image of the print head on the display. A movement quantity between the current head position and the new position is calculated based on the displayed image of print head 4 and based on the value of variable CP. Variable CP is updated in accordance with the new position for print head 4. Upon calculating a new position of print head 4 and setting the value in variable CP, print head 4 is physically moved to the position corresponding to the value set in variable CP in step S407. After the print head is set, flow returns to step S402 and the process for confirming the left end position is repeated.

On the other hand, in a case in which the instruction in step S403 is not an instruction to move print head 4 or in a case a designated print head position is inappropriate, the value of variable CP is not changed and the physical movement of print head 4 is not executed.

Once the operation is satisfied with the left position, appropriate keyboard entry causes flow to jump to step S408 and the value of variable CP (the current print head position) is stored in variable LP. In step S409, print head 4 is physically set at the left end position and the position of print head 4 is stored in RAN 38. In Step S410, process of determining a left end position is terminated. At this point it may be desirable to initiate the printing of the designated image without setting a right end position. Otherwise, the process for setting the right end position will commence.

Figure 5:
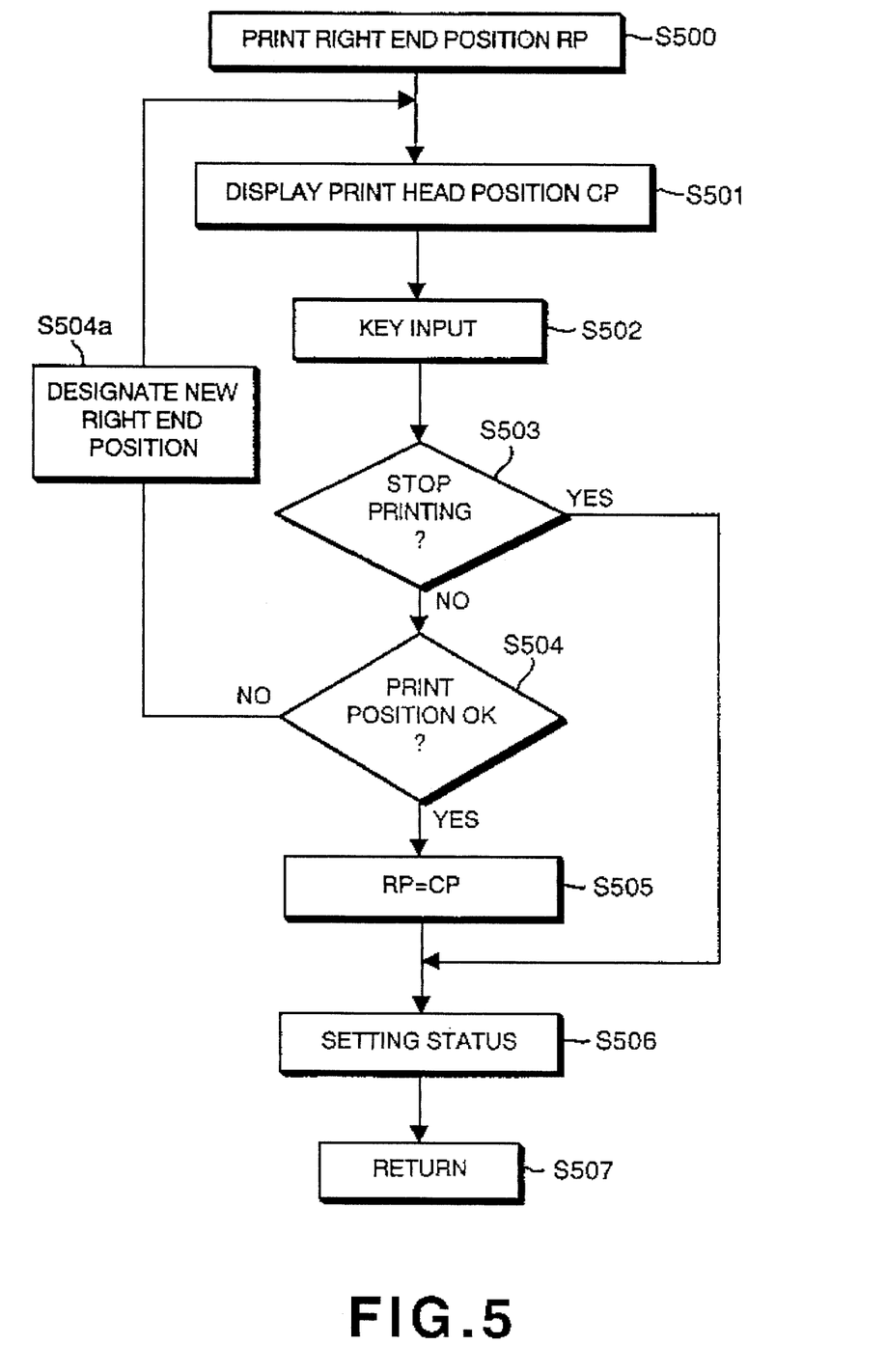
FIG. 5 is a flow diagram which illustrates in greater detail step of S308 which is the procedure for controlling a print position at the right end of a recording medium.

FIG. 5 is a flow diagram describing in more detail step S308 of FIG. 3 which is the process for altering a right end position of an image with respect to a recording medium.

In step S500, the control operation for printing a right end position of an image is initiated. In step S501, a value of variable CP which indicates the current print head position is displayed on display 7, and the current print head position of print head 4 is displayed in the same manner as described above. The operator can either confirm the print head position or designate a new right end position in step S502 by entering a command via keyboard 2. In step S503, the command is examined to determine if a stop image printing command has been entered. If such a command has been entered, flow Jumps to step S506. In a case that such a stop command has not been entered, flow proceeds to step S504. In step S504, a determination is made as to whether the right end position is appropriately set with respect to the recording medium. If the right end position is not appropriate, flow proceeds to step S504a at which point the operator enters a new right end position. After the new right end is designated in step S504a, flow returns to step S501 at which point print head 4 will be displayed on display 7 and the process is repeated for confirming the right end position. However, in the case that the right end position is appropriate, the current head position becomes the right end position and the value of variable CP is stored into variable RP. In step S506, the right end position is set by physically moving print head 4 to the right end position and the confirmed position is stored in RAM 38. In step S507, the process for setting the right end position is terminated.

Thus, an image printer can accurately position an image onto a recording medium by setting a left print position in accordance with a current position of the print head of the image printer, setting a right print position by adding a horizontal printing width of the stored image to the left print position and providing an operator with the opportunity to confirm each end position prior to printing the image.

The aforementioned description of the present invention has been provided with setting a left end position prior to setting a right end position. However, it is to be understood that a left end position can be set after setting a right end position by shifting the right end position in accordance with the size of the image to be printed.

A second embodiment of the present invention will now be discussed with respect to FIGS. 6 and 7.

In a second embodiment of the present invention, pattern image data stored in an image storage area such as disk 36a or ROM 37 is printed by printer 3. Pattern image data is a single unit of image data, such as a pattern in a fancy border, which is repeated in a lateral direction or in a vertical direction to form a continuous flowing image. The pattern image data is printed after matching image data position with a recording medium on printer 3. FIG. 6 is a flow diagram which illustrates a process by which a continuous printing operation of pattern image data in a lateral direction of an image printer is executed.

In step S600, an operator inputs a command to execute printing of pattern image data via keyboard 2. Once an operator has initiated the process for printing pattern image data, the operator designates a pattern image data type to be printed in step S601. Various image patterns which are stored in either disk 36a, ROM 37, or receiver buffer 38a can be selected and designated by the operator to be read and output by printer 3.

In step S602, a size of the pattern image data designated by the operator in step S601 is examined. The number of picture elements thereof is stored in variables contained in work memory 38b as follows: the number of picture elements in the lateral direction is stored in variable GW and the number of picture elements in the vertical direction is stored in variable GD. The image data size stored in Variable GW and variable GD are compared to determine if the picture element density of the pattern image data is different from a dot density of a printer. A comparison is also made to determine if the printing magnification has been varied due to an enlarging function or a reduction function. If either of these situations exist, then a value obtained by multiplying the number of picture elements of the image data by an appropriate conversion rate is stored in GW and GD.

In step S603, the current physical position of print head 4 is stored in variable CP of work memory 38b. In step S604, an operator sets a print position at an upper left end of an image utilizing variable CP as an initial value and the set value for the left end of an image is stored in variable LP. Thereafter, the operator either confirms the left end position or designates a new left end position much in the same manner as described previously with respect to steps S304 and S305.

In step S605, a determination is made as to whether a stop image printing command has been input in step S604. In a case that such a command has been entered, the process is immediately terminated. However, in a case that such a command has not been entered, flow proceeds to step S606. In step S606, a print limit right end position, determined by the specifications set by printer 3, is set in variable CP. In step S607, print head 4 is moved to a position corresponding to variable CP. An operator sets a position from the right end of a print image in step S608 and the set value is stored in variable RP. The process for setting the right end position will be discussed in greater detail with respect to FIG. 7.

In step S609, a determination is made as to whether a stop image printing command has been input. If such a command has been entered, processing is stopped. However, if such a command has not been entered, flow proceeds to step S610. In step S610, pattern image data designated in step S601 is output to printer 3 and formed in a continuous lateral direction within print buffer 38c and is then output to printer 3 in accordance with both variable LP and variable RP. In step S611, the printing operation is terminated and print head 4 returns to the home position.

Figure 6:
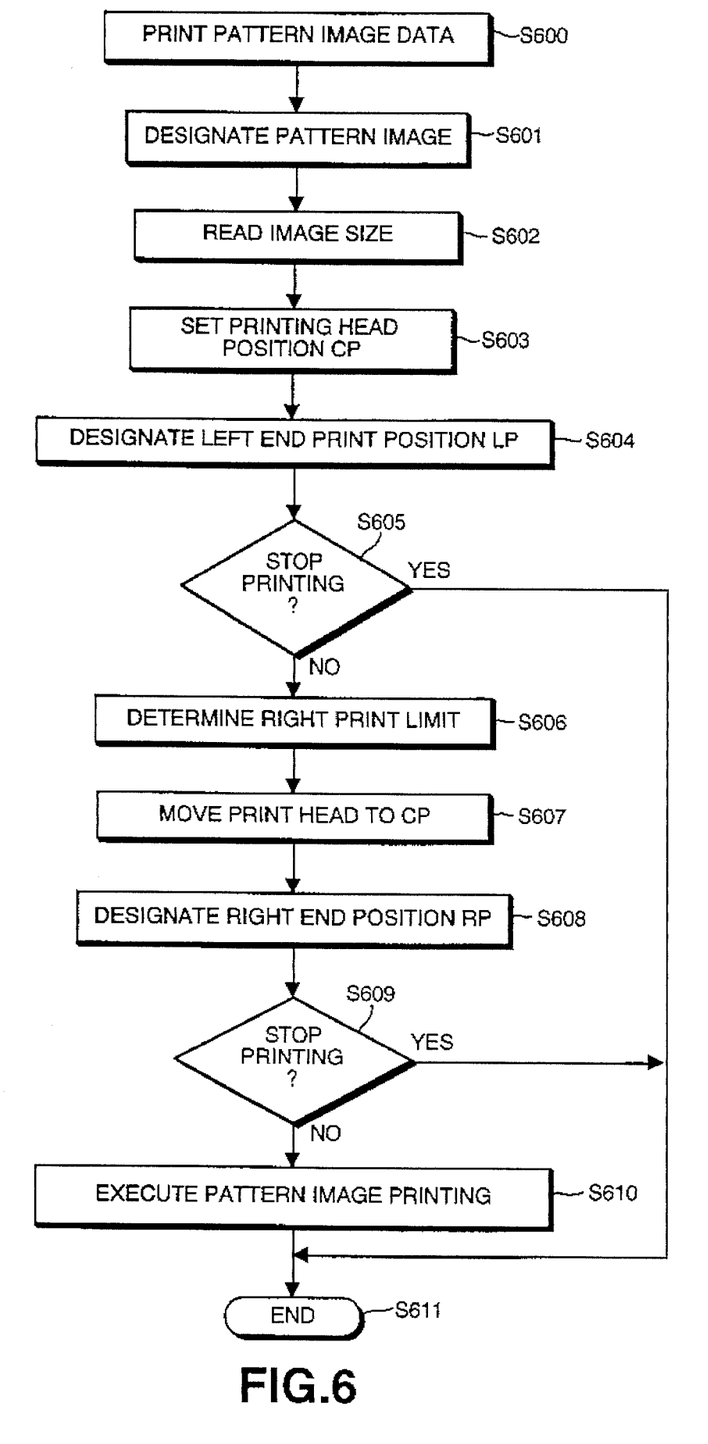
FIG. 6 is a flow diagram which illustrates the control procedure at the time of executing continuous printing of pattern image data.
Figure 7:
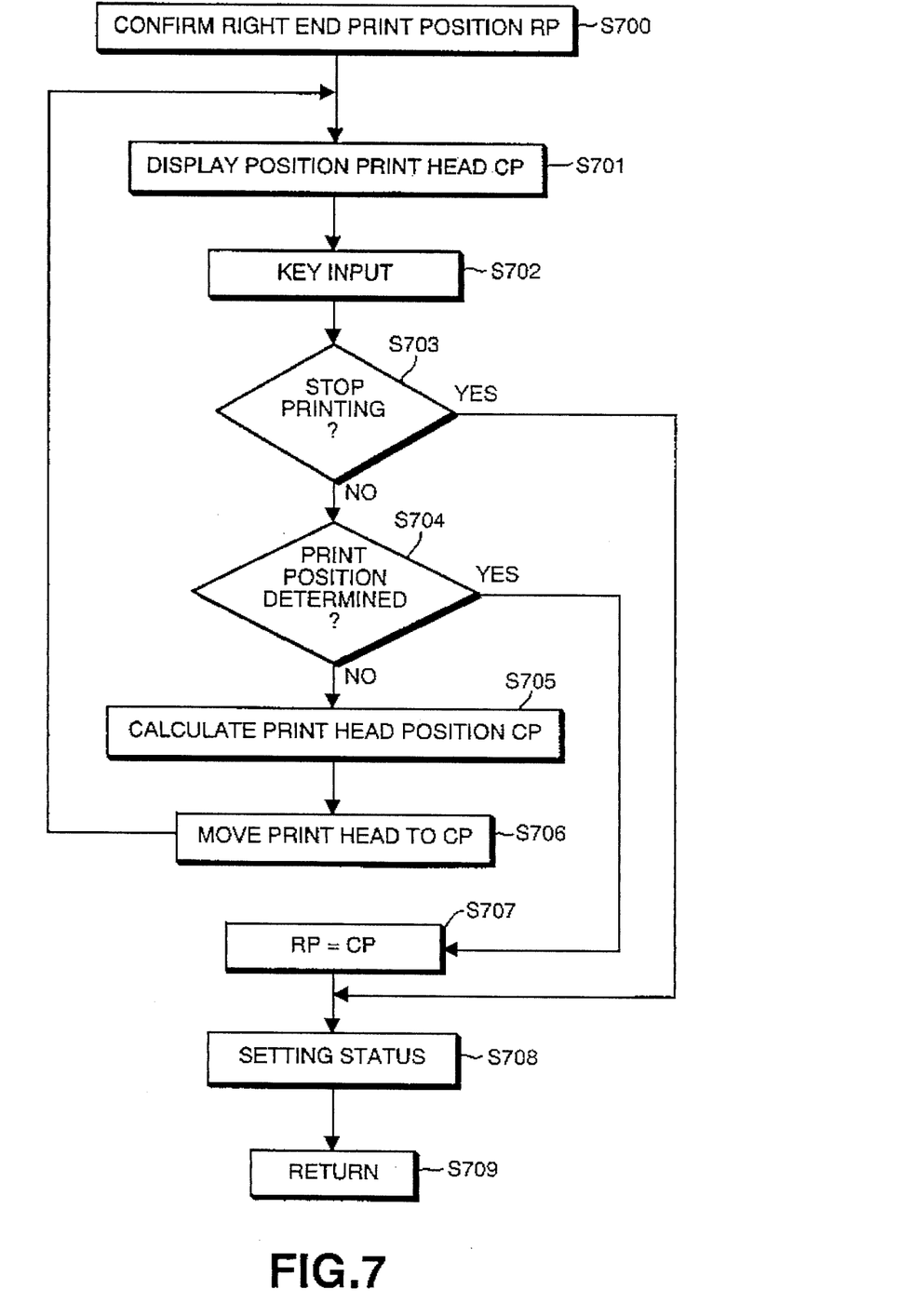
FIG. 7 is a flow diagram which lo illustrates the control procedure at a time of confirming a print position at the right end of a recording medium at the time of executing continuous printing of pattern image data.

FIG. 7 is a flew diagram describing in more detail step S608 of FIG. 6 which is a process for setting a right end position during continuous printing of pattern image data.

In step S700, CPU 35 initiates an operation to confirm the right end position of the print image. In step S701, a value of variable CP, representing a current position of print head 4, is displayed on display 7. The display may be in any suitable form, e.g., a digital type or a scale type or an image print range indication or a compressed image display.

In step S702, the operator enters a command via keyboard 2 to either confirm the right end position as displayed or to redesignate on the display a new right end position. In step S703, a determination is made as to whether the command is a command to stop image printing. If such a command has been entered, the printing process is immediately stopped and flow proceeds to step S708 and the current head position as displayed for the right end position is confirmed. On the other hand, if a stop printing command has not been entered, flow proceeds to step S704. In step S704, a determination is made as to whether or not there has been a command for determining a new right end print position. If such a command has been entered, flow proceeds to step S705. Once a request for designating a new position by the operator has been entered, the operator, using keyboard 2, designates a new position on display 7. The difference between stored variable CP and the new position is calculated and stored in a new variable CP. In step S706, print head 4 is moved to a position corresponding to variable CP and flow returns to step S701.

Consequently, in a case in which the command in step S702 is not a command to designate a new right end position for print head 4 or in the case in which the newly designated position for print head 4 is inappropriate, the value of variable CP does not change and the movement of print head 4 is not executed. However, if the operator confirms the position of print head 4, then in step S707 the current value of variable CP is stored in variable RP and print head 4 is physically moved to that position. In step S708, either the right end print position is stored for printing or a stop image printing command is stored in RAM 38. In step S709, processing for the right end position is terminated.

What is claimed is:

1. A method for positioning an image onto a recording medium comprising the steps of:

determining a size of an image to be printed with respect to the recording medium size;

designating a first end position of the image with respect to the recording medium;

confirming the first end position, by displaying the first end position with respect to the recording medium; and designating, after the first end position is confirmed, a second end position by shifting the first end position in accordance with the size of the image, and confirming the second end position by displaying the second end position with respect to the recording medium.

2. A method according to claim 1, wherein the step of confirming the first end position further includes moving a print head to the first end position, and storing coordinates of the first end position in a memory.

3. A method according to claim 2, wherein in the case the displayed first end position is not acceptable, redesignating a first end position, redisplaying the redesignated first end position, moving a print head to the redesignated first end position, and storing coordinates of the redesignated first end position in a memory.

4. A method according to claim 1, wherein the step of confirming the first and second end positions further includes moving a print head to the end positions and storing coordinates of the end positions in a memory.

5. A method according to claim 4, wherein in the case the displayed end positions are not acceptable, redesignating the end positions, redisplaying the redesignated end positions, moving a print head to the redesignated end positions, and storing coordinates of the redesignated end positions in a memory.

6. An image printer comprising:

control means for controlling image printer operations;

image data storing means for storing image data;

image printing means for printing image data stored in the image storing means onto a recording medium, said image printing means including a print head;

print position setting means for setting a print position of the image printing means, said control means providing current position data to said print position setting means, wherein a left print position is set in accordance with a current position of the print head of the image printing means; and display means for displaying an image to be printed, said display means displaying the current position of the print head with respect to the image to be printed and to the recording medium, wherein the print position setting means sets a right print position by adding a horizontal printing width of the stored image to the left print position with respect to the recording medium.

7. An apparatus according to claim 6, further comprising a drive for receiving read/write media, wherein said read/write media stores image data.

8. An apparatus according to claim 7, wherein said read/write media is a floppy disk.

9. An apparatus according to claim 6, further comprising a scanner for scanning and inputting image data, said scanner storing image data in said image data storing means.

10. An apparatus according to claim 6, further comprising input means for inputting commands to said control means, wherein said control means determines printer operations in accordance with process steps stored in a memory.

11. An image printer comprising:

control means for controlling image printer operations;

image data storing means for storing image data;

image printing means for printing image data stored in the image storing means onto a recording medium, said image printing means including a printhead;

print position setting means for setting a print position of the image printing means, said control means providing current position data to said print position setting means, wherein the right print position of the stored image is set to a current position of the print head of the image printing means on the recording medium; and display means for displaying an image to be printed, said display means displays the current position of the print head with respect to the image to be printed and to the recording medium, wherein the print position setting means sets a left print position is obtained by subtracting a horizontal printing width of the stored image from the right print position with respect to the recording medium.

12. An apparatus according to claim 11, further comprising a drive for receiving read/write media, wherein said read/write media stores image data.

13. An apparatus according to claim 12, wherein said read/write media is a floppy disk.

14. An apparatus according to claim 11, further comprising a scanner for scanning and inputting image data, said scanner storing image data in said image data storing means.

15. An apparatus according to claim 11, further comprising input means for inputting commands to said control means, wherein said control means determines printer operations in accordance with process steps stored in a memory.

16. A method for positioning an image onto a recording medium comprising the steps of:

determining a size of an image to be printed with respect to a size of a recording medium;

designating a first end position of the image with respect to the recording medium;

confirming the first end position;

designating, after the first end position has been confirmed, a second end position by shifting the first end position in accordance with the size of the image; and confirming the second end position, wherein the step of confirming the first end position includes displaying the first end position with respect to the recording medium, and wherein the step of confirming the second end position includes displaying the second end position with respect to the recording medium.

17. A method according to claim 16, wherein the step of confirming the first end position further includes moving a print head to the first end position, and storing coordinates of the first end position in a memory.

18. A method according to claim 16, wherein in the case the displayed first end position is not acceptable, redesignating a first end position, redisplaying the redesignated first end position, moving a print head to the redesignated first end position, and storing coordinates of the redesignated first end position in a memory.

19. A method according to claim 16, wherein the step of confirming the second end position further includes moving a print head to the second end position and storing coordinates of the second end position in a memory.

20. A method according to claim 19, wherein in the case the displayed second end position is not acceptable, redesignating a second end position, redisplaying the redesignated second end position, moving a print head to the redesignated second end position, and storing coordinates of the redesignated second end position in a memory.

21. An image printer comprising:

control means for controlling image printer operations;

image data storing means for storing image data;

image printing means for printing image data stored in the image storing means onto a recording medium, said image printing means including a print head; and print position setting means for setting a print position of the image printing means, said control means providing current position data to said print position setting means, wherein a left print position is set in accordance with a current position of the print head of the image printing means with respect to the recording medium and a right print position is set by adding a horizontal printing width of the stored image to the left print position.

22. An apparatus according to claim 21, further comprising a drive for receiving read/write media, wherein said read/write media stores image data.

23. An apparatus according to claim 22, wherein said read/write media is a floppy disk.

24. An apparatus according to claim 21, further comprising a scanner for scanning and inputting image data, said scanner storing image data in said image data storing means.

25. An apparatus according to claim 21, further comprising input means for inputting commands to said control means, wherein said control means determines printer operations in accordance with process steps stored in a memory.

26. An image printer comprising:

control means for controlling image printer operations;

image data storing means for storing image data;

image printing means for printing image data stored in the image storing means onto a recording medium, said image printing means including a print head; and print position setting means for setting a print position of the image printing means, said control means providing current position data to said print position setting means, wherein a left print position is set to a current position of the print head of the image printing means with respect to the recording medium and a right print position is set by adding a horizontal printing width of the stored image to the left print position, and wherein the print head is automatically shifted to a position on the recording medium corresponding to the right print position.

27. An apparatus according to claim 26, further comprising a drive for receiving read/write media, wherein said read/write media stores image data.

28. An apparatus according to claim 27, wherein said read/write media is a floppy disk.

29. An apparatus according to claim 26, further comprising a display means for displaying an image to be printed, said display means displaying the current position of the print head with respect to the image to be printed.

30. An apparatus according to claim 26, further comprising a scanner for scanning and inputting image data, said scanner storing image data in said image data storing means.

31. An apparatus according to claim 26, further comprising input means for inputting commands to said control means, wherein said control means determines printer operations in accordance with process steps stored in a memory.

32. An image printer comprising:
   control means for controlling image printer operations;
   image data storing means for storing image data;
   image printing means for printing image data stored in the image storing means, said image printing means including a print head; and
   print position setting means for setting a print position of the image printing means, said control means providing current position data to said print position setting means, wherein a left print position is set to a current position of the print head of the image printing means with respect to the recording medium and the right print position is set as a printing limit position of the image printer, and wherein the print head is automatically shifted to a position corresponding to the right print position with respect to the recording medium.

33. An apparatus according to claim 32, further comprising a drive for receiving read/write media, wherein said read/write media stores image data.

34. An apparatus according to claim 33, wherein said read/write media is a floppy disk.

35. An apparatus according to claim 32, further comprising a display means for displaying an image to be printed, said display means displays the current position of the print head with respect to the image to be printed.

36. An apparatus according to claim 32, further comprising a scanner for scanning and inputting image data, said scanner storing image data in said image data storing means.

37. An apparatus according to claim 32, further comprising input means for inputting commands to said control means, wherein said control means determines printer operations in accordance with process steps stored in a memory.

38. An image printer comprising:
   control means for controlling image printer operations;
   image data storing means for storing image data;
   image printing means for printing image data stored in the image storing means onto a recording medium, said image printing means including a print head; and
   print position setting means for setting a print position of the image printing means, said control means providing current position data to said print position setting means, wherein the right print position of the stored image is set to a current position of the print head of the image printing means and a left print position is obtained by subtracting a horizontal printing width of the stored image from the right print position.

39. An apparatus according to claim 38, further comprising a drive for receiving read/write media, wherein said read/write media stores image data.

40. An apparatus according to claim 39, wherein said read/write media is a floppy disk.

41. An apparatus according to claim 38, further comprising a scanner for scanning and inputting image data, said scanner storing image data in said image data storing means.

42. An apparatus according to claim 38, further comprising input means for inputting commands to said control means, wherein said control means determines printer operations in accordance with process steps stored in a memory.

43. An image printer comprising:
   control means for controlling image printer operations;
   image data storing means for storing image data;
   image printing means for printing image data stored in the image storing means, said image printing means including a print head; and
   print position setting means for setting a print position of the image printing means, said control means providing current position data to said print position setting means, wherein the right print position is set to a current position of the print head of the image printing means with respect to a recording medium and a left print position is obtained by subtracting a horizontal printing width of the stored image from the right end position, and wherein the print head is automatically shifted to a position corresponding to the left printing position of the image on the recording medium.

44. An apparatus according to claim 43, further comprising a drive for receiving read/write media, wherein said read/write media stores image data.

45. An apparatus according to claim 44, wherein said read/write media is a floppy disk.

46. An apparatus according to claim 43, further comprising a display means for displaying an image to be printed, said display means displays the current position of the print head with respect to the image to be printed.

47. An apparatus according to claim 43, further comprising a scanner for scanning and inputting image data, said scanner storing image data in said image data storing means.

48. An apparatus according to claim 43, further comprising input means for inputting commands to said control means, wherein said control means determines printer operations in accordance with process steps stored in a memory.

49. An image printer for accurately aligning and printing an image onto a recording media, comprising:
   control means for controlling image printer operations;
   image data storing means for storing image data;
   image printing means for printing image data stored in the image storing means, said image printing means including a print head; and
   print position setting means for setting a print position of the image printing means, said control means providing position data to said print position setting means, wherein a right print position is set as a current position of the print head of the image printing means with respect to the recording medium and a left print position is set with a printing limit position of the image printer, and wherein the print head is automatically shifted to a position corresponding to the left print position of the image on a recording medium.

50. An apparatus according to claim 49, further comprising a drive for receiving read/write media, wherein said read/write media stores image data.

51. An apparatus according to claim 50, wherein said read/write media is a floppy disk.

52. An apparatus according to claim 49, further comprising a display means for displaying an image to be printed, said display means displays the current position of the print head with respect to the image to be printed.

53. An apparatus according to claim 49, further comprising a scanner for scanning and inputting image data, said scanner storing image data in said image data storing means.

54. An apparatus according to claim 49, further comprising input means for inputting commands to said control means, wherein said control means determines printer operations in accordance with process steps stored in a memory.

55. A method for positioning an image onto a recording medium comprising the steps of:

determining a size of an image to be printed;

designating a first end position of the image with respect to the recording medium;

designating a second end position by shifting the first end position in accordance with the size of the image; and confirming a first end position and confirming a second end position, wherein the first end position is displayed with respect to the recording medium and the second end position is displayed with respect to the recording medium.

56. A method according to claim 55, wherein the step of confirming the first end position further includes moving a print head to the first end position, and storing coordinates of the first end position in a memory.

57. A method according to claim 56, wherein in the case the displayed first end position is not acceptable, redesignating a first end position, redisplaying the redesignated first end position, moving a print head to the redesignated first end position, and storing coordinates of the redesignated first end position in a memory 58. A method according to claim 55, wherein the step of confirming the second end position further includes moving a print head to the second end position and storing coordinates of the second end position in a memory.

59. A method according to claim 58, wherein in the case the displayed second end position is not acceptable, redesignating a second end position, redisplaying the redesignated second end position, moving a print head to the redesignated second end position, and storing coordinates of the redesignated second end position in a memory.

* * * * *

UNITED STATES PATENT AND TRADEMARK OFFICE
CERTIFICATE OF CORRECTION

PATENT NO. : 5,539,863

DATED : July 23, 1996

INVENTORS : Ueda et al.

It is certified that error appears in the above-identified patent and that said Letters Patent is hereby corrected as shown below:

COLUMN 2:

Line 52, "lo" should be deleted.

COLUMN 5:

Line 57, RAN 38." should read --RAM 38.--.

COLUMN 7:

Line 40, "flew" should read --flow--.

COLUMN 9:

Line 5, "An apparatus" should read --An image printer--;
Line 8, "An apparatus" should read --An image printer--;
Line 10, "An apparatus" should read --An image printer--;
Line 12, "An apparatus" should read --An image printer--;
Line 33, "is obtained" should be deleted;
Line 36, "An apparatus" should read --An image printer--;
Line 40, "An apparatus" should read --An image printer--;
Line 42, "An apparatus" should read --An image printer--; and
Line 45, "An apparatus" should read --An image printer--.

UNITED STATES PATENT AND TRADEMARK OFFICE
CERTIFICATE OF CORRECTION

PATENT NO. : 5,539,863

DATED : July 23, 1996

INVENTORS : Ueda et al.

It is certified that error appears in the above-identified patent and that said Letters Patent is hereby corrected as shown below:

COLUMN 10:

```
Line 35, "An apparatus" should read --An image printer--;
Line 38, "An apparatus" should read --An image printer--;
Line 40, "An apparatus" should read --An image printer--;
Line 43, "An apparatus" should read --An image printer--; and
Line 65, "An apparatus" should read --An image printer--.
```

COLUMN 11:

```
Line 1,  "An apparatus" should read --An image printer--;
Line 3,  "An apparatus" should read --An image printer--;
Line 7,  "An apparatus" should read --An image printer--;
Line 10, "An apparatus" should read --An image printer--;
Line 31, "An apparatus" should read --An image printer--;
Line 34, "An apparatus" should read --An image printer--;
Line 36, "An apparatus" should read --An image printer--;
Line 40, "An apparatus" should read --An image printer--;
Line 43, "An apparatus" should read --An image printer--;
Line 63, "An apparatus" should read --An image printer--; and
Line 66, "An apparatus" should read --An image printer--.
```

UNITED STATES PATENT AND TRADEMARK OFFICE
CERTIFICATE OF CORRECTION

PATENT NO. : 5,539,863

DATED : July 23, 1996

INVENTORS : Ueda et al.

It is certified that error appears in the above-identified patent and that said Letters Patent is hereby corrected as shown below:

COLUMN 12:

Line 1, "An apparatus" should read --An image printer--;
Line 4, "An apparatus" should read --An image printer--;
Line 26, "An apparatus" should read --An image printer--;
Line 29, "An apparatus" should read --An image printer--;
Line 31, "An apparatus" should read --An image printer--;
Line 35, "An apparatus" should read --An image printer--;
Line 38, "An apparatus" should read --An image printer--;
Line 44, "media," should read --medium--,;
Line 61, "An apparatus" should read --An image printer--;
Line 64, "An apparatus" should read --An image printer--; and
Line 66, "An apparatus" should read --An image printer--.

UNITED STATES PATENT AND TRADEMARK OFFICE
CERTIFICATE OF CORRECTION

PATENT NO. : 5,539,863

DATED : July 23, 1996

INVENTORS : Ueda et al.

It is certified that error appears in the above-identified patent and that said Letters Patent is hereby corrected as shown below:

COLUMN 13:

Line 3, "An apparatus" should read --An image printer--; and
Line 6, "An apparatus" should read --An image printer--.

Signed and Sealed this

Twentieth Day of May, 1997

Attest:

BRUCE LEHMAN

Attesting Officer                Commissioner of Patents and Trademarks